United States Patent [19]

Plancon et al.

[11] Patent Number: 4,888,507
[45] Date of Patent: Dec. 19, 1989

[54] STEPPING MOTOR ROTOR ASSEMBLY FOR AN ELECTRONIC TIMEPIECE

[75] Inventors: Michel Plancon, Besancon; Michel Bertrix, Saint Vit, both of France

[73] Assignee: Timex Corporation, Waterbury, Conn.

[21] Appl. No.: 263,319

[22] Filed: Oct. 27, 1988

[51] Int. Cl.⁴ .................. H02K 15/02; H02K 37/14
[52] U.S. Cl. ..................... 310/40 MM; 310/49 R; 310/156; 310/42
[58] Field of Search ............. 310/12, 40 MM, 156, 310/42, 49 R

[56] References Cited

U.S. PATENT DOCUMENTS

| | | | |
|---|---|---|---|
| 2,488,729 | 11/1949 | Kooyman | 171/209 |
| 3,943,698 | 3/1976 | Ono | 58/23 |
| 3,953,752 | 4/1976 | Bannon | 310/156 |
| 4,035,677 | 7/1977 | Kusayama et al. | 310/42 |
| 4,067,101 | 1/1978 | Ono | 310/40 MM |
| 4,095,129 | 6/1978 | Tanai et al. | 310/49 R |
| 4,206,379 | 6/1980 | Onada | 310/156 |
| 4,340,560 | 7/1982 | Migeon | 264/249 |

FOREIGN PATENT DOCUMENTS 0025864 2/1987 Japan .................. 310/49 R

Primary Examiner—Patrick R. Salce
Assistant Examiner—Judson H. Jones
Attorney, Agent, or Firm—William C. Crutcher

[57] ABSTRACT

An improved stepping motor rotor assembly comprises a rotor having a shaft and a driving member such as a gear pinion, a centering washer disposed on the shaft and a recess with a short finished cylindrical wall coaxial with the shaft and annular abutment surface at the bottom of the recess, a rare earth permanent magnet having a rough center hole preferably drilled by laser beam defining an annular clearance with the shaft and having a finished outer cylindrical wall extending into the recess with a loose fit to center the magnet with respect to the rotor axis, and a holding washer forming an interference fit with the shaft and pressing the magnet axially against the abutment surface on the centering washer. The centering washer may be restrained in axial position by a light interference fit with the shaft or it may be held by contacting the driving member.

7 Claims, 1 Drawing Sheet

STEPPING MOTOR ROTOR ASSEMBLY FOR AN ELECTRONIC TIMEPIECE

BACKGROUND OF THE INVENTION

This invention relates generally to a rotor assembly for a stepping motor used in an electronic timepiece, and more particularly to an improved stepping motor rotor assembly which is less costly to manufacture.

A quartz analog wristwatch employs a small stepping motor consisting of a stator with coil periodically energized with electrical current pulses of alternating polarity to step the motor and drive the wristwatch hands through a gear train. The rotor of the stepping motor includes a drive member such as a gear pinion, a permanent magnet, usually having two poles, and a pinion shaft with journals rotatably mounted in the watch movement. The permanent magnet is often in the shape of a small cylinder or ring with a central hole through it for the pinion shaft.

The permanent magnets, typically anistrophic rare earths such as samarium cobalt, are extremely brittle and difficult machine. Because of the small size of the rotor, close tolerances are required in the stepping motor. Various improvements have been suggested to reduce breakage of the magnets and to reduce cost of manufacturing a stepping motor rotor. The possibility of breakage increases when designs require a press fit of the magnet material to the rotor pinion shaft, or when compressive forces on the outer diameter of the magnet are necessary to hold it in place on the rotor. Protective bushings have been used to reduce breakage.

A desirable characteristic of a stepping motor rotor is that it have a low moment of inertia about its axis of rotation. Since the moment of inertia varies as the square of the radius of rotation, the use of unnecessary protective bushings between the inner diameter of the magnet and the rotor shaft or the use of metallic shells encasing the outer diameter of the magnet are to be avoided.

Prior art rotor assemblies with plastic internal bushings disposed between the shaft and the magnet are shown in U.S. Pat. Nos. 4,206,379—Onda; 3,953,752—Bannon; 2,488,729—Kooyman; and 4,340,560—Migeon assigned to Applicant's assignee.

An example of a stepping motor rotor with permanent magnet held clamped axially between metal bushings which are press fit with an interference fit on the rotor shaft is seen in U.S. Pat. No. 4,035,677—Kusayama. In the Kusayama Patent, centering of the magnet is performed by loosely fitting the inner diameter of the magnet on the bushings, which requires very close tolerances and expensive finishing of the inside hole diameter of the brittle magnet material. Constructions are shown where the inner hole diameter of the permanent magnet is finished and pressed directly onto the rotor shaft in U.S. Pat. No. 3,943,698 which uses a reinforcing plate of stainless steel or other nonmagnetizable material bonded to the magnet to prevent cracking the brittle material.

A rotor assembly which employs a radial wall and outer protective metal sheath into which the magnet is press fit on its outer diamter is disclosed in U.S. Pat. No. 4,095,129—Tanai. Although this permits forming the inner diameter of the rare earth magnet by a rough drilling process, the outer metallic protecting sheath both increases the moment of inertia and offers the possibility of breakage by compressive stresses due to the press fit on the outer diameter of the magnet.

It would be desirable to provide an improved rotor assembly with a low moment of inertia and a method of holding the permanent magnet with reduced stress on the brittle magnet. It would also be desirable to provide a design permitting improved manufacturing methods which would reduce the cost of the rotor assembly.

Accordingly, one object of the present invention is to provide an improved stepping motor rotor assembly and method of manufacture for a low cost, stepping motor rotor.

Another object of the invention is to provide a simplified design for a stepping motor rotor with lower movement of inertial.

DRAWINGS

The invention, both as to organization and method of practice, together with further objects and advantages thereof, will best be understood by reference to the following description, taken in connection with the accompanying drawings in which:

FIG. 1 is an elevation view, partly in section, of a stepping motor rotor assembly according to a preferred embodiment of the present invention, and FIG. 2 is a similar view of a modification of the invention.

SUMMARY OF THE INVENTION

Briefly stated, the improved assembly comprises a rotor having a shaft and a driving member such as a gear pinion, a centering washer disposed on the shaft and defining on its side opposite the driving member a recess with a finished short cylindrical wall coaxial with the shaft and annular abutment surface at the bottom of the recess, a rare earth permanent magnet having a rough-drilled center hole defining an annular clearance with the shaft and having a finished outer cylindrical wall extending into the recess with a loose fit to center the magnet with respect to the rotor axis, and a holding washer forming an interference fit with the shaft and pressing the magnet axially against the abutment surface on the centering washer. The centering washer may be restrained axially by a light interference fit with the shaft or it may be held by contact with the driving member. During manufacture of the rotor magnet, its center hole is directly pierced and rough-drilled by a planetary laser beam without the need of costly finishing by grinding. Since no press fit of the magnet is required, cost of assembly and breakage is reduced.

DESCRIPTION OF THE PREFERRED EMBODIMENT

Figure 1:
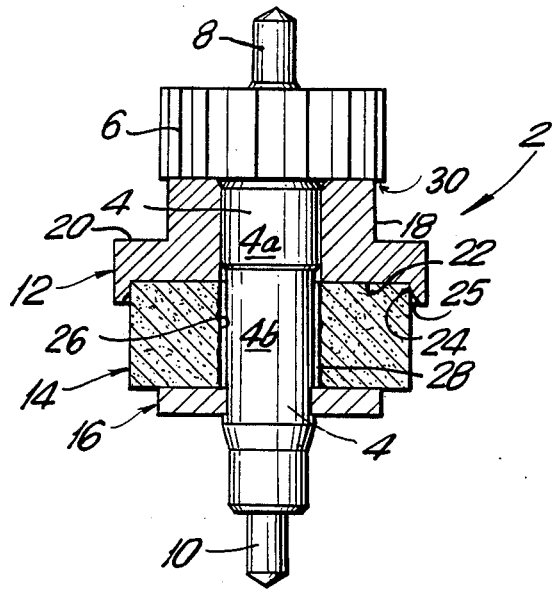

Referring now to FIG. 1 of the drawing, a rotor assembly shown generally as 2 includes a rotor which has a shaft 4 and a driving member 6, comprising a gear pinion designed to engage the tiepiece geartrain. Driving member 6 could also comprise a pair of diametrically opposed pins as employed in U.S. Pat. No. 4,647,218 issued Mar. 3, 1987 and assigned to Applicant's assignee. Shaft 4 and driving member 6 are here made of a single machined steel part and have opposed journals 8, 10 which are rotatably mounted in the movement bearings. Shaft 4 includes a machined boss 4a of slightly larger diameter than a longer adjacent portion 4b of lesser diameter.

The rotor assembly also includes a centering washer 12, a ring shaped permanent magnet 14 and a holding washer 16.

The centering washer 12, which is preferably of brass, but which may be alternatively made of other non-magnetic materials such as aluminium or plastic, includes an axial section 18 abutting the underside of driving member 6 and a radial section 20. A circular recess is formed in the side of the centering washer 12 opposite the driving member. The recess has a flat annular abutment surface 22 and a short, but smooth finished cylindrical wall 24. Wall 24 terminates in an annular beveled edge or chamfer 25 which assists assembly.

Permanent magnet 14 is initially made as a sintered disk of rare earth material, such as samarium cobalt. Such materials are available under trade names VAC 170 manufactured by Vacuumschmelze, AG or REC 20 manufactured by Unimag Recoma, AG. In accordance with the present invention, the outer diameter is finished machined to a smooth cylindrical surface with a diameter slightly less than that of cylindrical wall 24, so that it will fit with close tolerance, but loosely into the recess. Only about 30% of the axial length of the magnet fits into the recess.

Also in accordance with the present invention, the manufacturing process includes rough drilling of a hole 26 in the center of magnet 14, preferably using a planetary laser beam without the need of costly finishing by internal grinding operation. The interior hole 26 is cut so as to provide ample clearance around shaft portion 4b as indicated by the annular clearance designated with reference numeral 28. Therefore, grinding with precise tolerances is not necessary during formation of the center hole 26. This greatly reduces the cost of manufacture of the rotor assembly.

The holding washer 16 may be a simple flat brass washer having an internal hole, either polygonal or circular which forms an interference fit with shaft portion 4b.

Means are provided to restrain the axial movement of centering washer 12 on shaft 4. One such means includes manufacture of the internal diameter of centering washer 12 such that it provides a light interference fit on shaft boss 4a to hold it in axial position on the shaft. Another means for providing axial restraint is to employ a loose fit and to restrain axial movement by abutment of the centering washer against driving member 6 at reference numeral 30. These two methods may both be used together if desired.

METHOD OF MANUFACTURE

After machining of the rotor with drive member and shaft, the centering washer 12 is inserted on the shaft boss 4a and caused to abut drive member 6. A loose interference fit of washer 12 may be used together with or in lieu of such abutment, the permanent magnet 14 having been finished ground on the outside diameter and rough laser drilled to provide the center hole is inserted over the shaft portion 4b with a loose fit into the recess to abut the surface 22 on one end thereof. Radial centering of the magnet 14 with respect to the shaft axis is performed by the short cylindrical wall 24 without compressive stress on the magnet. Lastly, the holding washer 16 is press fit onto shaft portion 4b against the other end of magnet 14, pressing it axially against abutment surface 22 on centering washer 12. This axial force is distributed over the ends of the magnet and holds it in place on the rotor.

MODIFICATION

Figure 2:
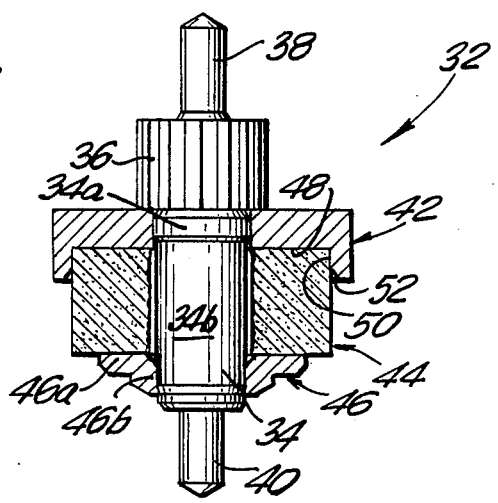

A modified form of the invention is seen in FIG. 2. This variation provides a shorter axial geometry of the stepping motor rotor. The washers supplying the axial holding force have been modified accordingly. Stepping motor rotor 32 includes a rotor shaft 34 with drive member 36, and journals 38, 40. Centering washer 42 is disc-shaped with a hole forming a light interference fit with a shorter boss 34a on shaft 34. A recess with annular abutment surface 48 and a smooth cylindrical wall 50 receives the end of the permanent magnet 44 in a loose fit, assembly being aided by means of the internal chamfer 52. Holding washer 46 has an L-shaped cross-section, one leg of the "L" forming an abutment portion 46a with the underside of magnet 44 and the other leg of the "L" 46b forming an interference fit with the shaft portion 34b.

The operation and method of assembly are the same as indicated previously in connection with FIG. 1. However, shorter axial length, additional flexibility and lower moment of inertia are provided by the centering washer 48 and the special holding washer 46. Also, if desired, the axial restraint of centering washer 42 may be entirely performed by its abutment with driving member 36, the short boss 34a merely performing a radial centering function.

OPERATION

With the improvement of the present invention, the two functions of (1) centering the magnet radially with respect to the axis and (2) holding it in position on the shaft are separated. Centering is performed by the short cylindrical walls of the centering washer recess, whereas holding in position is performed by axial clamping between two large flat washer surfaces. Because of the short lip on the recess centering washer, and the elimination of internal bosses between the magnet and the shaft, the moment of inertia of the rotor assembly is reduced. By laser drilling the magnet center hole and finish grinding only the outer diameter of the magnet, the overall cost is greatly reduced. Also the lack of radial press fit stress on the magnet reduces possibility of breakage. There is a possibilty to further reduce the moment of inertia by using low density materials like aluminium or plastic for the centering washer, which would not be feasible for a press fit assembly.

Easy rotor magnet assembly is performed without risk of damaging the magnet since it is only clamped between the flat surfaces of two washers, whereas a conventional rare earth magnet assembly by press fit gives a risk of breakage of the brittle material.

Examples of the rotor dimensions of FIG. 1 are as follows:

|  | FIG. 1 | FIG. 2 |
| --- | --- | --- |
| Rotor shaft (4b) diameter | 0.5 mm | 0.44 mm |
| Centering ring cylindrical wall diameter | 1.36 mm | 1.26 mm |
| Rotor magnet finished outside diameter | 1.35 mm | 1.25 mm |
| Rotor magnet inside diameter of rough center hole | 0.47 mm | .047 mm |
| Axial length of permanent magnet | 0.5 mm | 0.5 mm |
| Depth of centering ring cylindrical wall | 0.15 mm | 0.15 mm |
| Rotor moment of inertia | $3 \times 10^{-3}$ gmm$^2$ | $3 \times 10^{-3}$ gmm$^2$ |

While there has been described what is considered herein to be the preferred embodiment of the invention, other modifications will occur to those skilled in the art, and it is desired to include in the appended claims all such modifications which fall within the true spirit and scope of the invention.

We claim:

1. A rotor assembly for a stepping motor comprising:
   a rotor having a shaft and driving member,
   a centering washer disposed on said shaft and having a side thereof opposite and said driving member defining a recess having a finished cylindrical wall portion coaxial with said shaft and defining a first annular abutment surface at the bottom of said recess,
   a substantially cylindrical rare earth permanent magnet having a rough center hole defining an annular clearance with said shaft and having a finished outer wall portion extending only a portion of its axial length into said recess with a loose fit and contacting said first annular surface,
   a holding washer having a center hole forming an interference fit with said shaft and pressed onto said shaft to force said magnet axially against the first abutment surface, and
   means restraining axial movement of said centering washer on said shaft, wherein said axial movement restraining means comprises said drive member and said centering washer abuts said driving member so as to restrain the centering washer axially on the shaft, whereby said washers hold the magnet in position on said rotor shaft and whereby said cylindrical wall portion of the recess centers the magnet radially with respect to the shaft axis.

2. Rotor assembly according to claim 1, wherein said axial movement restraining means further includes a boss portion on said shaft, and wherein said centering washer is pressed on said boss portion with an interference fit.

3. Rotor assembly in accordance with claim 1, wherein said axial movement restraining means comprises said drive member and said centering washer abuts said driving member so as to restrain the centering washer axially on the shaft.

4. The combination according to claim 1, wherein said centering washer is manufactured of a low density material taken from the group consisting of aluminium and plastic, whereby the rotor moment of inertia is reduced.

5. The combination according to claim 1, wherein the depth of said recess is on the order of 30% of the axial length of said permanent magnet.

6. A rotor assembly for a stepping motor comprising:
   a rotor having a shaft and driving member,
   a centering washer disposed on said shaft including an axial extension on the side thereof towards said driving member and having a side thereof opposite and said driving member defining a recess having a finished cylindrical wall portion coaxial with said shaft and defining a first annular abutment surface at the bottom of said recess,
   a substantially cylindrical rare earth permanent magnet having a rough center hole defining an annular clearance with said shaft and having a finished outer wall portion extending only a portion of its axial length into said recess with a loose fit and contacting said first annular surface,
   a flat holding washer having a center hole forming an interference fit with said shaft and pressed onto said shaft to force said magnet axially against the first abutment surface, and
   means restraining axial movement of said centering washer on said shaft, whereby said washers hold the magnet in position on said rotor shaft and whereby said cylindrical wall portion of the recess centers the magnet radially with respect to the shaft axis.

7. A rotor assembly for a stepping motor comprising:
   a rotor having a shaft and driving member,
   a centering washer disposed on said shaft comprising a radial disc shaped member abutting said driving member near its inner diameter and having a side thereof opposite said driving member defining a recess having a finished cylindrical wall portion coaxial with said shaft and defining a first annular abutment surface at the bottom of said recess,
   a substantially cylindrical rare earth permanent magnet having a rough center hole defining an annular clearance with said shaft and having a finished outer wall portion extending only a portion of its axial length into said recess with a loose fit and contacting said first annular surface,
   a holding washer having a L-shaped cross section and having a center hole forming an interference fit with said shaft and pressed onto said shaft to force said magnet axially against the first abutment surface, and
   means restraining axial movement of said centering washer on said shaft, whereby said washers hold the magnet in position on said rotor shaft and whereby said cylindrical wal portion of the recess centers the magnet radially with respect to the shaft axis.

* * * * *